US011979322B2

(12) United States Patent
Peng et al.

(10) Patent No.: US 11,979,322 B2
(45) Date of Patent: May 7, 2024

(54) METHOD AND APPARATUS FOR PROVIDING SERVICE FOR TRAFFIC FLOW

(71) Applicant: Huawei Technologies Co., Ltd., Shenzhen (CN)

(72) Inventors: Shuping Peng, Beijing (CN); Zhenbin Li, Beijing (CN)

(73) Assignee: HUAWEI TECHNOLOGIES CO., LTD., Shenzhen (CN)

(*) Notice: Subject to any disclaimer, the term of this patent is extended or adjusted under 35 U.S.C. 154(b) by 168 days.

(21) Appl. No.: 17/527,555

(22) Filed: Nov. 16, 2021

(65) Prior Publication Data
US 2022/0078114 A1 Mar. 10, 2022

Related U.S. Application Data

(63) Continuation of application No. PCT/CN2020/078044, filed on Mar. 5, 2020.

(30) Foreign Application Priority Data

May 17, 2019 (CN) .......................... 201910413445.5

(51) Int. Cl.
H04L 45/741 (2022.01)
H04L 45/00 (2022.01)
H04L 45/50 (2022.01)

(52) U.S. Cl.
CPC ............ *H04L 45/741* (2013.01); *H04L 45/34* (2013.01); *H04L 45/50* (2013.01)

(58) Field of Classification Search
CPC ....... H04L 45/741; H04L 45/34; H04L 45/50; H04L 41/34; H04L 12/4633; H04L 47/24;
(Continued)

(56) References Cited

U.S. PATENT DOCUMENTS

2012/0120955 A1   5/2012   Vissers et al.
2015/0373169 A1  12/2015   Singh et al.
(Continued)

FOREIGN PATENT DOCUMENTS

CN     1501643 A     6/2004
CN   102025586 A     4/2011
(Continued)

OTHER PUBLICATIONS

C. Filsfils, Ed., "IPv6 Segment Routing Header (SRH)," draft-ietf-6man-segment-routing-header-18, Apr. 5, 2019, 30 pages.
(Continued)

*Primary Examiner* — Charles C Jiang
*Assistant Examiner* — Shawn D Miller
(74) *Attorney, Agent, or Firm* — Conley Rose, P.C.

(57) ABSTRACT

A method for providing a service for a traffic flow includes a network device receives a first packet; and when a packet feature of the first packet matches a packet feature of the traffic flow, the network device encapsulates an indication identifier of the traffic flow into the first packet to obtain a second packet, and sends the second packet. The second packet is an Internet Protocol (IP) version 6 (IPv6) packet or a Multiprotocol Label Switching MPLS packet. The indication identifier indicates the service provided for the traffic flow.

20 Claims, 11 Drawing Sheets

(58) Field of Classification Search
CPC ... H04L 47/2483; H04L 47/35; H04L 69/161; H04L 69/22; H04L 69/06; H04L 2101/659
See application file for complete search history.

(56) References Cited

U.S. PATENT DOCUMENTS

| | | | |
|---|---|---|---|
| 2016/0050141 A1 | 2/2016 | Wu et al. | |
| 2016/0315864 A1 | 10/2016 | Tan et al. | |
| 2017/0111267 A1 | 4/2017 | Lin et al. | |
| 2017/0250907 A1* | 8/2017 | Pignataro | H04L 43/04 |
| 2017/0251065 A1* | 8/2017 | Furr | H04L 45/64 |
| 2017/0339072 A1* | 11/2017 | Pignataro | H04L 45/566 |
| 2019/0068495 A1 | 2/2019 | Jeuk et al. | |
| 2020/0099610 A1* | 3/2020 | Heron | H04L 45/22 |
| 2020/0162431 A1* | 5/2020 | Goldschlag | H04L 63/20 |
| 2020/0228446 A1 | 7/2020 | Geng et al. | |
| 2021/0359939 A1 | 11/2021 | Wan et al. | |

FOREIGN PATENT DOCUMENTS

| | | |
|---|---|---|
| CN | 102158977 A | 8/2011 |
| CN | 105337852 A | 2/2016 |
| CN | 105471738 A | 4/2016 |
| CN | 106254265 A | 12/2016 |
| CN | 107493235 A | 12/2017 |
| CN | 108632098 A | 10/2018 |
| CN | 109561021 A | 4/2019 |
| CN | 109743340 A | 5/2019 |
| EP | 1585260 A1 | 10/2005 |
| EP | 3678338 A1 | 7/2020 |
| EP | 3896932 A1 | 10/2021 |

OTHER PUBLICATIONS

RFC 1809, C. Partridge, "Using the Flow Label Field in IPv6," Jun. 1995, 6 pages.
RFC 6437, S. Amante et al, "IPv6 Flow Label Specification," Nov. 2011, 15 pages.
RFC 8200, S. Deering et al, "Internet Protocol, Version 6 (IPv6) Specification," Jul. 2017, 42 pages.

* cited by examiner

A format of an IPv6 header

METHOD AND APPARATUS FOR PROVIDING SERVICE FOR TRAFFIC FLOW

CROSS-REFERENCE TO RELATED APPLICATIONS

This application is a continuation of International Patent Application No. PCT/CN2020/078044, filed on Mar. 5, 2020, which claims priority to Chinese Patent Application No. 201910413445.5, filed on May 17, 2019. The disclosures of the aforementioned applications are hereby incorporated by reference in their entireties.

TECHNICAL FIELD

This application relates to the field of communications technologies, and in particular, to a method and an apparatus for providing a service for a traffic flow.

BACKGROUND

In order to provide different services for a traffic flow, different flow identifiers need to be encapsulated into packets of the traffic flow based on formats corresponding to the different services. In this way, in a packet forwarding process, a network device may perform operations corresponding to the services on the packets based on the flow identifiers in different formats. However, when a packet of the traffic flow passes through different domains, if network devices in different domains need to provide different services for the packet of the specific traffic flow, format conversion or re-encapsulation needs to be performed on the encapsulated flow identifiers when the packet of the traffic flow is transmitted between different domains. Therefore, processing of the traffic flow passing through different types of domains is complex.

SUMMARY

Embodiments of this application provide a method and an apparatus for providing a service for a traffic flow, to improve processing performance of the traffic flow.

According to a first aspect, a method for providing a service for a traffic flow is provided. According to the method, when a network device serving as a head node or an ingress node determines that a packet feature of the received first packet matches a packet feature of the traffic flow, the network device adds an indication identifier of the traffic flow to the first packet to obtain a second packet, and sends the second packet to an intermediate node. The indication identifier of the traffic flow is used to indicate the service provided for the traffic flow. The intermediate node obtains the indication identifier of the traffic flow from the received second packet, and processes the second packet according to the indication identifier and a processing policy. In this way, the intermediate node may directly identify the indication identifier and perform an operation of a corresponding service, to provide the corresponding service for the traffic flow, without performing format conversion on an encapsulated indication identifier, or performing redundant encapsulation of indication identifiers in a plurality of formats.

According to a second aspect, an apparatus for providing a service for a traffic flow is provided. According to the solution, a network device serving as a head node or an ingress node includes a receiving unit, an encapsulation unit, and a sending unit. The receiving unit is configured to receive a first packet. The encapsulation unit is configured to, encapsulate an indication identifier of the traffic flow into the first packet to obtain a second packet when a packet feature of the first packet matches a packet feature of the traffic flow, where the indication identifier of the traffic flow is used to indicate the service provided for the traffic flow. The sending unit is configured to send the second packet.

According to a third aspect, an apparatus for providing a service for a traffic flow is provided. According to the solution, the apparatus serving as an intermediate node includes a receiving unit, an obtaining unit, an execution unit, and a sending unit. The receiving unit is configured to receive a second packet. The obtaining unit is configured to obtain an indication identifier of a traffic flow based on the second packet, where the indication identifier of the traffic flow is used to indicate the service provided for the traffic flow. The execution unit is configured to perform an operation corresponding to the service on the second packet based on a mapping relationship between the indication identifier and the service. The sending unit is configured to send the packet.

According to a fourth aspect, a network device is provided. The network device includes a processor and a memory. The memory stores instructions. When the processor executes the instructions, the network device performs any one of the foregoing methods.

According to a fifth aspect, a computer program product is provided. When the computer program product runs on a computer, the computer is enabled to perform any one of the foregoing methods.

According to a sixth aspect, a computer-readable storage medium is provided. The computer-readable storage medium stores instructions. When the instructions run on a computer or a processor, the computer or the processor is enabled to perform any one of the foregoing methods.

In some embodiments of the foregoing solutions, the packet including the indication identifier is an Internet Protocol (IP) version 6 (IPv6) or Multiprotocol Label Switching (MPLS) packet.

Based on the foregoing technical solutions, in some embodiments, the indication identifier includes an identifier of a service. The service includes one or more of the following services: operations, administration, and maintenance (OAM), service function chaining (SFC), and Deterministic Networking (DetNet). When these services are performed, for example, when the packet is an IPv6 packet, an indication identifier included in the IPv6 packet indicates that an OAM operation needs to be performed on the IPv6 packet, and an intermediate node performs the specific OAM operation on the packet according to the indication identifier and a processing policy. For example, one or more operations such as packet loss count, jitter measurement, and delay measurement are performed.

Based on the foregoing technical solutions, in some embodiments, the indication identifier further includes an identifier of an operation corresponding to the service and/or a sequence number carried in a first packet.

Based on the foregoing technical solutions, in some embodiments, when the second packet is the IPv6 packet, the second packet includes an IPv6 extension header, and the IPv6 extension header includes the indication identifier. In this way, the indication identifier may be encapsulated into the IPv6 extension header in the second packet, and the intermediate node parses the received second packet, obtains the indication identifier from the IPv6 extension header, and performs a corresponding service operation on the second IPv6 packet according to the indication identifier and the processing policy. This can effectively improve efficiency of the intermediate node in processing IPv6 packets.

Based on the foregoing technical solutions, in some embodiments, in an IPv6 network, the IPv6 extension header includes a hop-by-hop options header field or a destination options header field of the second IPv6 packet. The hop-by-hop options header field or the destination options header field includes the indication identifier.

Based on the foregoing technical solutions, in some embodiments, in a Segment Routing over IPv6 (SRv6) network, the first IPv6 packet and the second IPv6 packet are SRv6 packets, the network device supports SRv6, the IPv6 extension header includes a segment routing header (SRH) of the second IPv6 packet, and the SRH includes the indication identifier. In one case, the SRH includes a segment identifier (SID), and the SID includes the indication identifier. In another case, the SID includes an arguments field, and the arguments field includes the indication identifier. In still another case, the SRH includes a tag field and/or a flags field, and the tag field or the flags field or both include the indication identifier.

Based on the foregoing technical solutions, in some embodiments, still in the SRv6 network, the first IPv6 packet and the second IPv6 packet are SRv6 packets, the network device supports SRv6, the second IPv6 packet includes an IPv6 header, the IPv6 header in the second IPv6 packet includes a source address (SA) field, and the SA field includes the indication identifier. Alternatively, the first IPv6 packet and the second IPv6 packet are SRv6 packets, the network device supports best effort (BE) in the SRv6, the IPv6 extension header of the second IPv6 packet includes a destination address (DA) field in the IPv6 header, and the DA field includes the indication identifier.

Based on the foregoing technical solutions, in some embodiments, the second IPv6 packet includes the IPv6 header, the IPv6 header includes a flow label field, and the flow label field includes the indication identifier.

Based on the foregoing technical solutions, in some embodiments, the indication identifier further includes a flow label or a flow identifier.

Based on the foregoing technical solutions, in some embodiments, the second packet is a SRv6 packet, the network device supports SRv6, the second packet includes an SRv6 segment list, and the SRv6 segment list includes the indication identifier.

Based on the foregoing technical solutions, in some embodiments, when the second packet is the MPLS packet, the second packet includes an MPLS label stack, and the MPLS label stack includes the indication identifier of the traffic flow. In some embodiments, the indication identifier is located at a last label in the MPLS label stack.

BRIEF DESCRIPTION OF DRAWINGS

To describe the technical solutions in some of the embodiments of this application, the following briefly describes the accompanying drawings for describing some of the embodiments. The accompanying drawings in the following description show some embodiments of this application, and an ordinary person skilled in the art may derive other drawings from these accompanying drawings.

DESCRIPTION OF EMBODIMENTS

Figure 1:
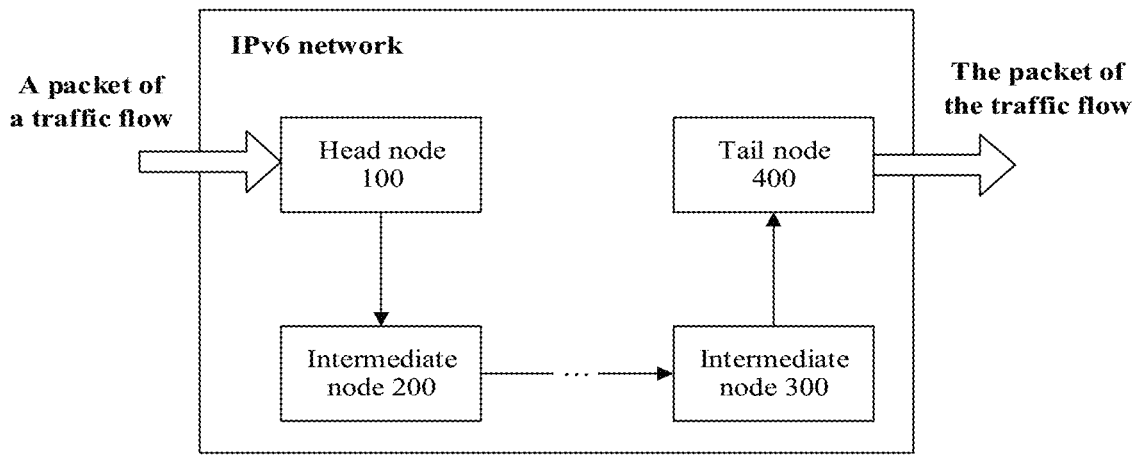
FIG. 1 is a schematic diagram of a framework of a network system in an application scenario according to an embodiment of this application.

Currently, services increase continuously, and different flow identifiers need to be encapsulated into packets of a traffic flow based on formats corresponding to different services. In this way, in a packet forwarding process, a network device may perform operations corresponding to services on the packet based on the flow identifiers in different formats.

However, when the packet of the traffic flow passes through different domains, if network devices in different domains provide different services for the packet of the traffic flow, format conversion needs to be performed on an encapsulated flow identifier after the packet of the traffic flow passes through a different domain. Consequently, processing of the packet of the traffic flow passing through different domains is relatively complex. In addition, when a plurality of services are provided for the packet of the traffic flow at the same time, flow identifiers of formats corresponding to the services may be encapsulated into the packet of the traffic flow, that is, the packet includes a plurality of flow identifiers in different formats at the same time. As a result, the packet of the traffic flow carries redundant flow identifiers.

Based on this, in the embodiments of this application, when a first packet needs to be transmitted between network devices in an IPv6 network to provide a service, a head node in the network may receive the first packet, and determine whether a packet feature of the first packet matches a packet feature of the traffic flow. When the packet feature of the first packet matches the packet feature of the traffic flow, the head node encapsulates an indication identifier corresponding to the traffic flow into the first packet to obtain a second packet, where the indication identifier of the traffic flow is used to indicate the service provided for the traffic flow. Then, the head node sends the second packet to a next hop of the head node, that is, an intermediate node, so that the intermediate node performs, based on a mapping relationship between an indication identifier in the second packet and the service, an operation corresponding to a corresponding service on the second packet, and so on, until the second packet is sent to a tail node. In some embodiments, the second packet may be an IPv6 packet or an MPLS packet, and the first packet may be a packet of any type. In some embodiments, the service provided for the traffic flow includes one or more of OAM, SFC, and DetNet. In some embodiments, the second packet is the IPv6 packet, and the indication identifier may be carried in an IPv6 extension header in the second packet, an SA field in an IPv6 header in the second packet, or a DA field in an IPv6 header in the second packet.

In this way, in the embodiments of this application, the head node in the network encapsulates the indication identifier of the traffic flow into the first packet, without encapsulating a flow identifier of a corresponding format for each service. Format conversion does not need to be performed on the encapsulated flow identifier even for cross-domain transmission of the first packet. A network device in each domain may identify the indication identifier and perform a corresponding service operation, to conveniently provide a corresponding service.

For example, a scenario in the embodiments of this application may be applied to a network system shown in FIG. 1. FIG. 1 is a schematic diagram of a structure of a network supporting an IPv6. The network includes a head node 100, an intermediate node 200, an intermediate node 300, and a tail node 400. It should be noted that, the head node 100, the intermediate node 200, the intermediate node 300, and the tail node 400 may be network devices that support the IPv6 network, for example, may be network devices that support SRv6. It may be understood that the head node 100, the intermediate node 200, the intermediate node 300, and the tail node 400 may be network devices such as a router or a switch that can forward packets and provide a service in the network.

In this application, a head node may alternatively be an entry node or an ingress node, and the head node is used as an ingress node of a network domain. The head node may be a device with a routing function, for example, a router. The intermediate node may be a device with a routing function, for example, a router.

It may be understood that the foregoing scenario is merely an example in the embodiments of this application, and imposes no limitation to the embodiments of this application.

With reference to the accompanying drawings, the following describes in detail, by using embodiments, a specific implementation of a method for providing a service in the embodiments of this application.

Figure 2:
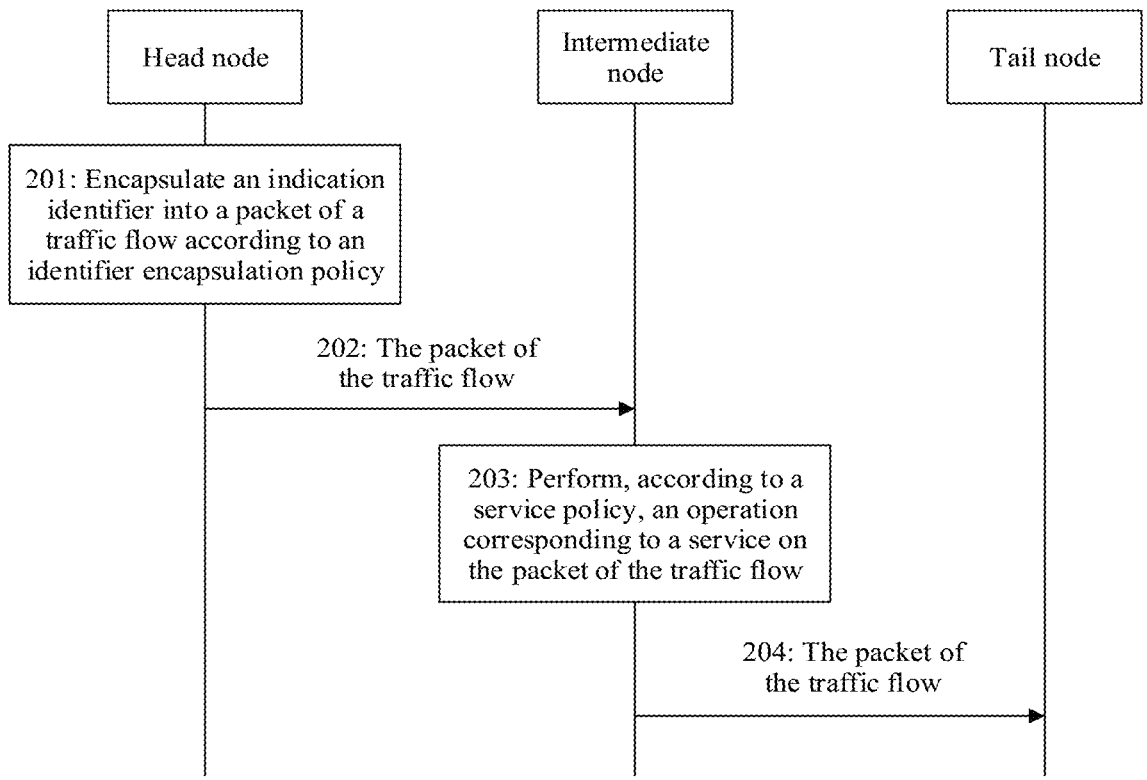
FIG. 2 is a schematic flowchart of a method for providing a service for a traffic flow according to an embodiment of this application.

FIG. 2 is a schematic flowchart of a method for providing a service for a traffic flow according to an embodiment of this application. It should be noted that the embodiment shown in FIG. 2 may be applied to the network architecture shown in FIG. 1, and the nodes shown in FIG. 1 correspondingly perform steps in the method shown in FIG. 2. During specific implementation, the method may include, for example, the following steps.

Step 201: A head node encapsulates an indication identifier into a packet of a traffic flow according to an identifier encapsulation policy.

To enable nodes that the traffic flow passes through to provide different services, different nodes in a network need to perform processing operations corresponding to the nodes on the packet of the traffic flow. In view of this, different policies need to exist in advance for different nodes that the traffic flow passes through. These policies may be an identifier encapsulation policy and a service policy that are directly configured on each node, or may be an identifier encapsulation policy and a service policy that are generated on a controller and separately delivered to a corresponding node. During specific implementation, when the packet of the traffic flow passes through a node in the network, to enable each node that the traffic flow passes through to provide a corresponding service, the head node may encapsulate the indication identifier in the packet of the traffic flow according to the identifier encapsulation policy that is corresponding to the traffic flow and that is configured on the node or delivered by the controller, so that an intermediate node performs, according to the indication identifier and the service policy, an operation of a corresponding service.

To make the description of this embodiment clearer, before the implementation of step 201 is described, the identifier encapsulation policy and the service policy are first described.

The identifier encapsulation policy is used to indicate a correspondence between a packet feature and an indication identifier. The identifier encapsulation policy includes a mapping relationship between a packet feature of the traffic flow and the indication identifier of the traffic flow. The packet feature is used to identify a packet belonging to a traffic flow. The head node may identify, based on the packet feature, whether a currently received packet/packets is/are a packet of a specific traffic flow or packets of specific traffic flows. As an example, the packet feature may include a 5-tuple of the packet (for example, a source IP address, a source port, a destination IP address, a destination port, and a transport layer protocol) or some specific fields in the packet feature.

When the packet received by the head node is an IPv6 packet, the packet feature may include content in a flow label field of an IPv6 header in the packet. Alternatively, the packet feature may include an SA and/or a DA in the packet. Alternatively, the packet feature may include content in a flow identifier (ID) field in the IPv6 packet. Alternatively, the packet feature may include two, three, or four of the flow label, the flow ID, the SA, or the DA in the packet. The indication identifier is used to be encapsulated into a packet matching the packet feature, to indicate the service provided for the traffic flow. In some embodiments, for the flow ID field, refer to descriptions in the Internet Engineering Task Force (IETF) Request for Comments (RFC) 1809. In some embodiments, for the flow label field, refer to descriptions in IETF RFC 6437 or RFC 8200.

The service policy is used to represent a correspondence between the indication identifier and the operation corresponding to a service. The service policy includes a mapping relationship between the indication identifier of the traffic flow and the service. The operation corresponding to the service means that the node needs to perform a corresponding processing operation to implement the service for a packet sent in the traffic flow. The service may be an SFC service, a DetNet service, a Postcard Based Telemetry (PBT) service, an OAM, or the like. For the OAM, specific operations may include one or more of specific operations such as packet counting and delay measurement. For the SFC, specific operations may include one or more of network address translation (NAT), firewall filtering, deep packet inspection (DPI), intrusion detection, and the like. For the DetNet service, specific operations may include multi-fed and selective receiving and/or flow identification. For the PBT service, specific operations may include performance data collection and/or flow identification.

It may be understood that the indication identifier in the identifier encapsulation policy and the service policy includes any one identifier or a combination of a plurality of identifiers of the following identifiers: an identifier of the traffic flow, an identifier of the service, and an identifier of an operation corresponding to the service. The identifier of the traffic flow may include a flow ID or a flow label. Packets that carry identifiers of a same traffic flow may be considered as belonging to the same traffic flow.

The identifier of the service may include a flag or a color. In one case, the node that the traffic flow passes through may provide only one service. The indication identifier may carry the color to indicate whether the service needs to be provided. For example, it is assumed that a node that a traffic flow corresponding to flow ID=1 passes through provides only an SFC service. When color=1 is configured in the indication identifier, it is considered that the node that the traffic flow passes through performs an operation corresponding to the SFC service, to ensure that the node that the traffic flow passes through provides the SFC service. When color=0 is configured, the node that the traffic flow passes through does not perform the operation corresponding to the SFC service, so that the node that the traffic flow passes through does not provide the SFC service. Based on a similar principle, when a value of color is 0, it may also indicate that the node that the traffic flow passes through performs the operation corresponding to the SFC service, and when the value of Color is 1, it may also indicate that the node that the traffic flow passes through does not perform the operation corresponding to the SFC service. In another case, the node that the traffic flow passes through may provide a plurality of services. In this case, the indication identifier may carry a flag to indicate a combination of provided services. For example, it is assumed that a node that a traffic flow corresponding to flow ID=2 passes through may provide the SFC service, the DetNet service, and the PBT service. When flag=10000 is configured in the indication identifier, it is considered that the node that the traffic flow passes through provides the SFC service. When flag=11000 is configured, the node that the traffic flow passes through provides the SFC service and the DetNet service. When flag=01100 is configured, the node that the traffic flow passes through provides the SFC service, the DetNet service, and the PBT service. It should be noted that the flag or color may implement indication through bitmask resetting.

In one case, an identifier of the operation corresponding to the service may be a template ID, and is used to indicate to perform, on the node processing the traffic flow, a service operation on the traffic flow. For example, when template ID=1, it indicates performing an operation of the SFC service on the traffic flow. As another example, when template ID=2, it indicates performing operations of the DetNet service and the SFC service on the traffic flow. In another case, the identifier of the operation corresponding to the service may alternatively be operation indication information. For example, the PBT service is requested. When the identifier of the operation corresponding to the service carries one or more of an inbound interface number, an outbound interface number, an inbound timestamp, an outbound timestamp, and other operation indication information, the node that the traffic flow passes through provides the PBT service, and performs a corresponding operation of the service: reporting one or more of the inbound interface number, the outbound interface number, the inbound timestamp, and the outbound timestamp.

It should be noted that the indication identifier may further carry a sequence number of the packet. The sequence number is used to identify a sequence number of the packet received by the node, and is generally used to calculate a packet loss status of the traffic flow. For example, for the IPv6 packet, after the head node marks the sequence number in the packet, when the packet is transmitted in the network, the nodes that the packet passes through may determine, based on the sequence number in the packet, whether packet loss occurs.

It may be understood that, for indication identifiers that include different content, the service policy correspondingly has a plurality of possible implementations. As example, the indication identifier may include only the flow ID. In this case, the service policy may be a correspondence between the flow ID and the operation corresponding to the service. As another example, the indication identifier may alternatively include only the template ID. In this case, the service policy may be a correspondence between the template ID and the operation corresponding to the service. For still another example, the indication identifier may alternatively include the flow ID and the flag. In this case, the service policy may be a correspondence between the flow ID, the flag, and the operation corresponding to the service. For yet another example, the indication identifier may alternatively include the flow ID and the template ID. In this case, the service policy may be a correspondence between the flow ID, the template ID, and the operation corresponding to the service. For still yet another example, the indication identifier may alternatively include the flag and the template ID. In this case, the service policy may be a correspondence between the flag, the template ID, and the operation corresponding to the service. As an additional example, the indication identifier may alternatively include the flow ID, the flag, and the template ID. In this case, the service policy may be a correspondence between the flow ID, the flag, the template ID, and the operation corresponding to the service. In each example, a sequence number may be added in a scenario in which packet loss statistics need to be collected. In this case, the service policy may further include a correspondence between the sequence number and the operation corresponding to the service. In some embodiments, the flow ID in this paragraph may alternatively be replaced with the flow label.

It should be noted that, assuming that a packet is forwarded in a tunnel, each node in the tunnel may use a label stack as a policy for forwarding the packet. For example, the label stack may be an MPLS label stack, or may also be an SRv6 segment list. The label stack includes the indication identifier. Further, the MPLS label stack or the SRv6 segment list includes the indication identifier. Furthermore, a last label in the MPLS label stack includes the indication identifier. During specific implementation, the label stack may be configured on the head node of the tunnel, or may be generated by the controller and delivered to the head node of the tunnel, so that the head node of the tunnel encapsulates the label stack into a packet, to indicate transmission of the packet in the tunnel. In this way, when the packet is transmitted on each node of the tunnel, original content of the packet may not be parsed, and an effective transmission path in the tunnel may be learned only by using the label stack. This improves packet forwarding efficiency in the tunnel.

After the identifier encapsulation policy and the service policy are described, the following describes in detail "the head node encapsulates the indication identifier in the packet of the traffic flow according to the identifier encapsulation policy" in step 201.

During specific implementation, when receiving a packet, the head node may first obtain a packet feature of the packet. Then, the packet feature of the packet is matched with the packet feature carried in the identifier encapsulation policy. When the packet feature of the packet matches the packet feature carried in the identifier encapsulation policy, it is considered that the received packet belongs to the traffic flow, and therefore, the indication identifier corresponding to the matched packet feature in the identifier encapsulation policy can be encapsulated into the packet. Otherwise, when the packet feature of the packet does not match the packet feature carried in the identifier encapsulation policy, it is considered that the received packet does not belong to the traffic flow. In this case, no indication identifier is encapsulated into the packet, and subsequent step 202 to step 204 are not performed. As an example, the matching may mean that the packet feature of the received packet is consistent with a packet feature carried in the identifier encapsulation policy, for example, a 5-tuple in the received packet is consistent with a 5-tuple of a traffic flow.

For example, it is assumed that the identifier encapsulation policy that is received by the head node and delivered by the controller includes: a correspondence between a packet feature A, a flow $ID_1$, and a template $ID_1$, a correspondence between a packet feature B, a flow $ID_2$, and a template $ID_2$, and a correspondence between a packet feature C, a flow $ID_3$, and a template $ID_3$. In one case, when receiving a packet X, the head node obtains a packet feature a of the packet X, and determines that the packet feature a matches the packet feature A in the identifier encapsulation policy, and the head node may encapsulate the indication identifiers: the flow $ID_1$ and the template $ID_1$ that are corresponding to the packet feature A into the packet X. In another case, when receiving a packet Y, the head node obtains a packet feature c of the packet Y, and determines that the packet feature c matches the packet feature C in the identifier encapsulation policy, and the head node may encapsulate the indication identifiers: the flow $ID_3$ and the template $ID_3$ that are corresponding to the packet feature C into the packet Y. In still another case, when receiving a packet Z, the head node obtains a packet feature d of the packet Z, and determines that the packet feature d does not match any of the packet features A, B, and C in the identifier encapsulation policy. In this case, the head node does not encapsulate any indication identifier into the packet Z.

It may be understood that the indication identifier may be encapsulated at any location of the packet theoretically. However, when the encapsulated packet arrives at each intermediate node, each intermediate node needs to read the indication identifier to provide a corresponding service. Some locations in the packet are locations to be read by each intermediate node, and some locations are not read by each intermediate node. When the indication identifier is encapsulated into a location that is not read by each intermediate node, an additional policy needs to be configured or the intermediate node needs to be updated, to ensure that all intermediate nodes can read the indication identifier. This greatly increases costs of providing the service by the node. However, when the indication identifier is encapsulated at the location to be read by each intermediate node, it can be ensured that all the intermediate nodes can read the indication identifier without configuring an additional policy or updating the intermediate node. This effectively reduces costs of providing the service by the node. Based on this, to improve packet processing efficiency of the intermediate node, the indication identifier may be encapsulated into a location that is in the packet and that is to be read by each intermediate node.

In an IPv6 network, after receiving a packet, the head node may encapsulate the received packet into an IPv6 packet, and may encapsulate the indication identifier into an IPv6 extension header. For example, in a schematic diagram of a format of an IPv6 header shown in FIG. 3, the indication identifier may be encapsulated into an extension header under the IPv6 header: a hop-by-hop options header field or a destination options header field. For another example, in a schematic diagram of another format of the IPv6 header shown in FIG. 4, the indication identifier may alternatively be encapsulated into a flow label field in the IPv6 header. It may be understood that, when the IPv6 packet reaches each intermediate node, the hop-by-hop options header, the destination options header in the IPv6 extension header, and the flow label field in the IPv6 header are all read. Therefore, when the indication identifier is encapsulated in the IPv6 header, the intermediate node may obtain the indication identifier without additionally reading another location of the packet or the like. This provides a data basis for the intermediate node to efficiently complete an operation corresponding to a service of the traffic flow.

Figure 5A:
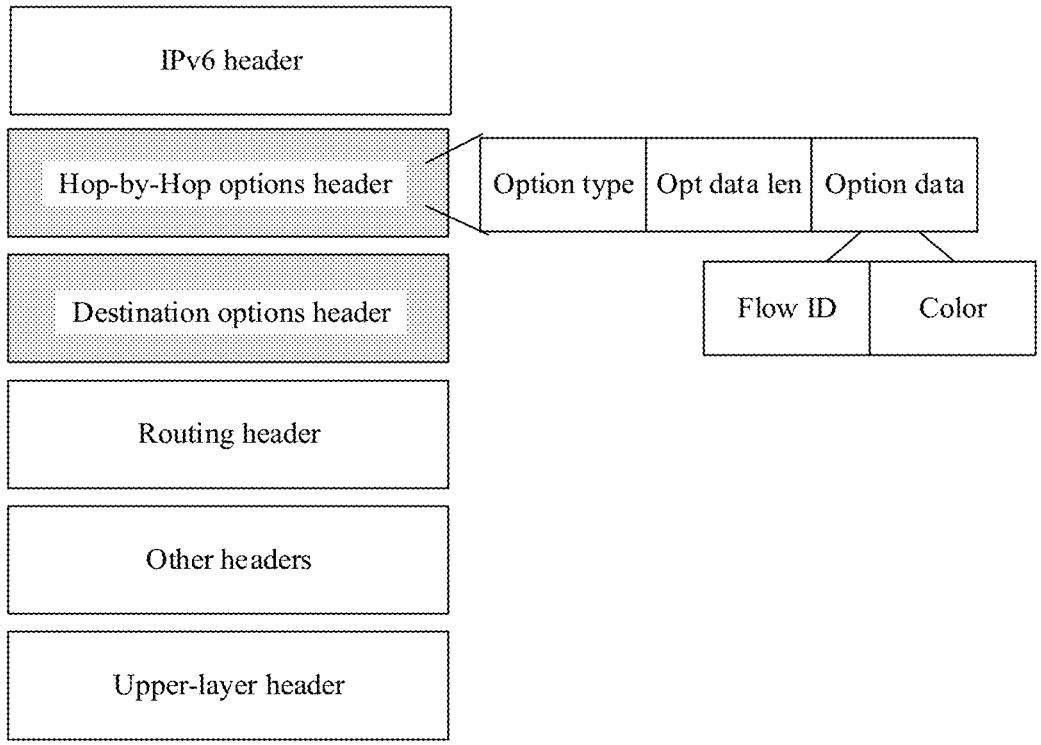
FIG. 5A is a schematic diagram of another format of an IPv6 header according to an embodiment of this application.
Figure 5B:
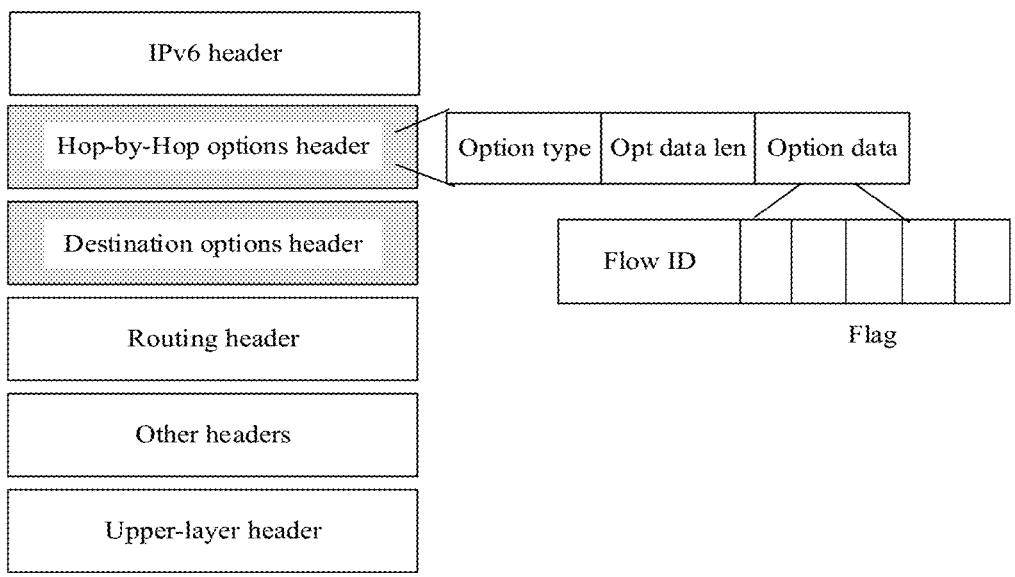
FIG. 5B is a schematic diagram of still another format of an IPv6 header according to an embodiment of this application.
Figure 5C:
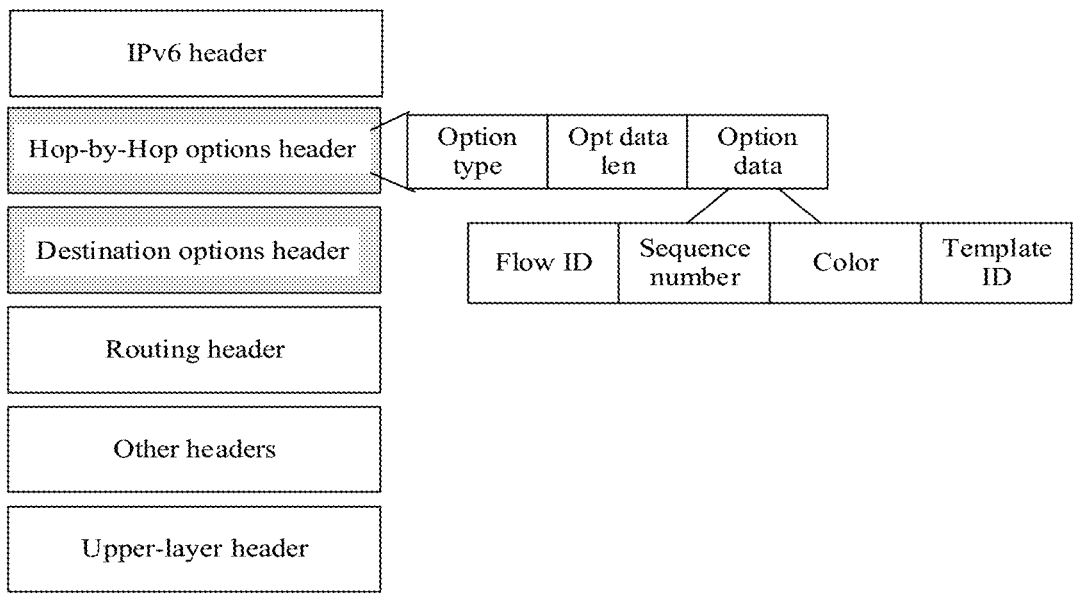
FIG. 5C is a schematic diagram of yet another format of an IPv6 header according to an embodiment of this application.
Figure 5D:
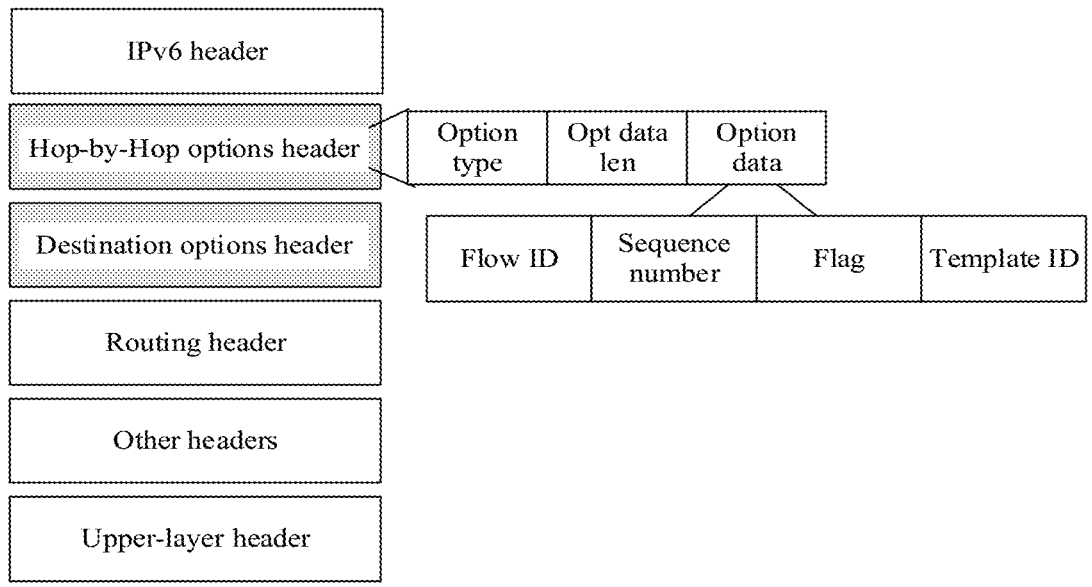
FIG. 5D is a schematic diagram of still yet another format of an IPv6 header according to an embodiment of this application.
Figure 5E:
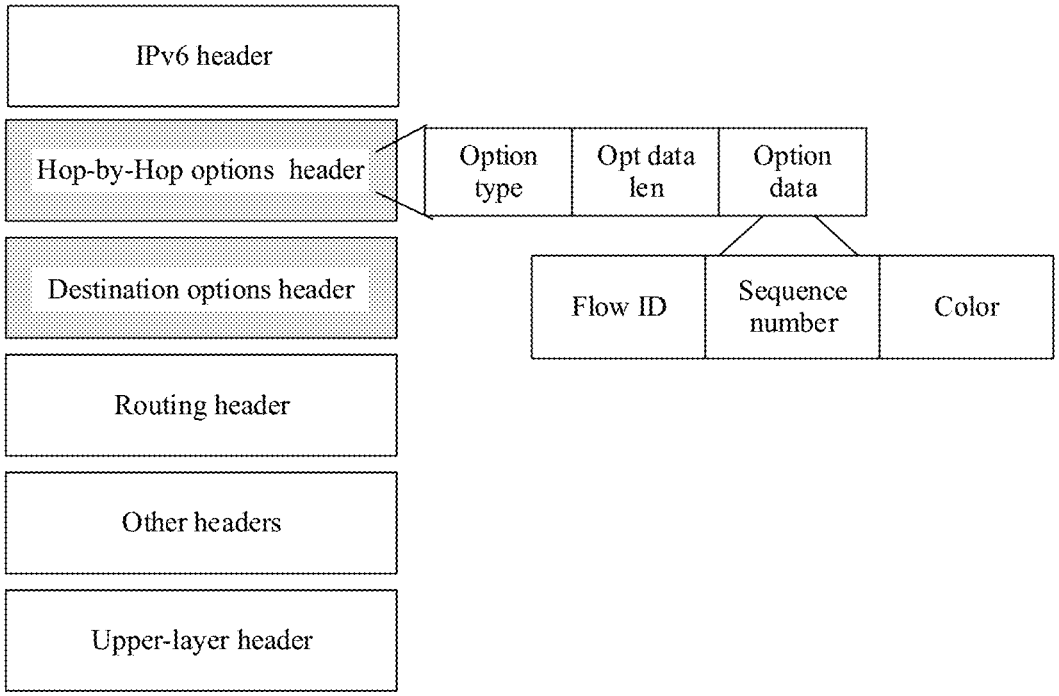
FIG. 5E is a schematic diagram of a further format of an IPv6 header according to an embodiment of this application.
Figure 5F:
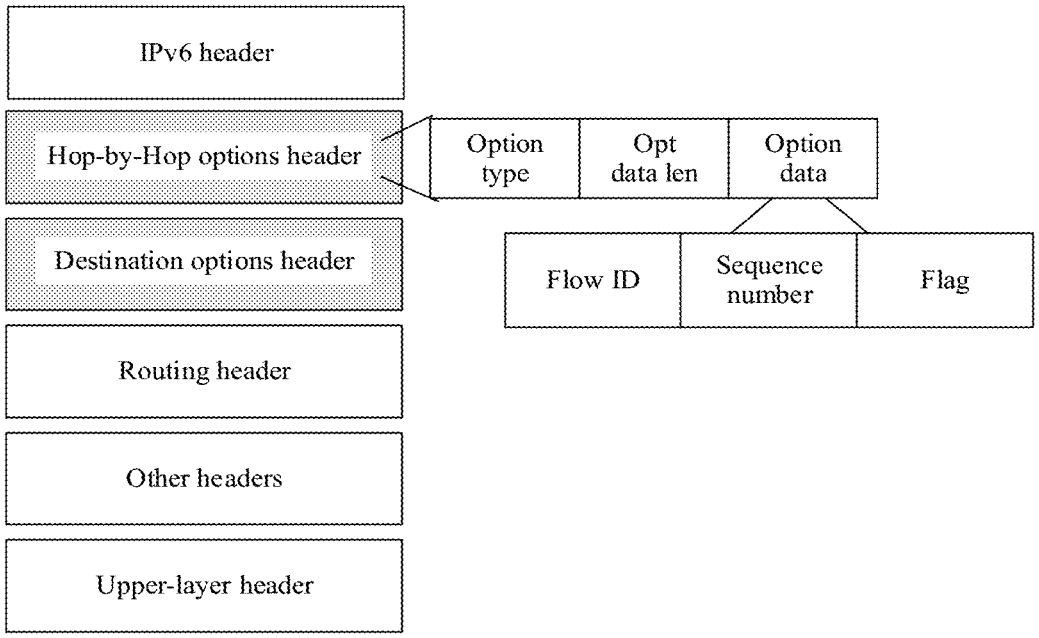
FIG. 5F is a schematic diagram of a still further format of an IPv6 header according to an embodiment of this application.

For example, referring to FIGS. 5A-5F, an example in which the indication identifier is placed in a hop-by-hop options header in an IPv6 extension header is used. The hop-by-hop options header field may include option type, option data length (opt data len), and option data fields. The indication identifier may be padded into the option data field. In one case, a format of the indication identifier is as shown in FIG. 5A, and the indication identifier includes a flow ID and a color. In another case, the format of the indication identifier is as shown in FIG. 5B, and the indication identifier includes a flow ID and a flag. In still another case, the format of the indication identifier is as shown in FIG. 5C, and the indication identifier includes a flow ID, a sequence number, a color, and a template ID. In yet another case, the format of the indication identifier is as shown in FIG. 5D, and the indication identifier includes a flow ID, a sequence number, a flag, and a template ID. In still yet another case, the format of the indication identifier is as shown in FIG. 5E, and the indication identifier includes a flow ID, a sequence number, and a color. In a further case, the format of the indication identifier is as shown in FIG. 5F, and the indication identifier includes a flow ID, a sequence number, and a flag.

Figure 3:
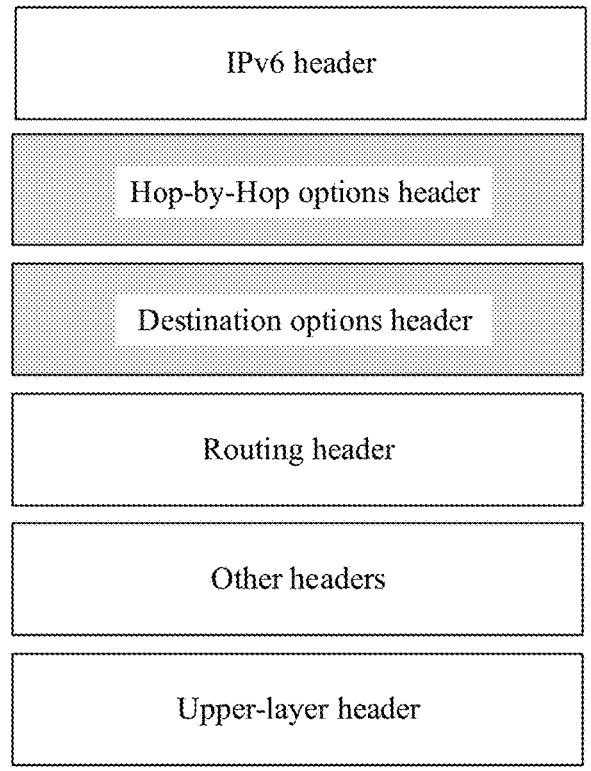
FIG. 3 is a schematic diagram of a format of an indication identifier according to an embodiment of this application.
Figure 4:
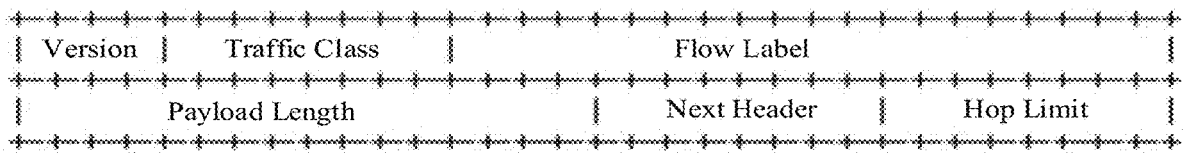
FIG. 4 is a schematic diagram of a format of an IPv6 header according to an embodiment of this application.

It should be noted that, to enable the head node to extract related information in the indication identifier from the IPv6 header/extension header, the head node may learn, in a protocol advertisement manner, a format of the indication identifier in the IPv6 header/extension header, and read the corresponding information according to the format, for example, the format shown in FIG. 3 or FIG. 4.

Figure 6:
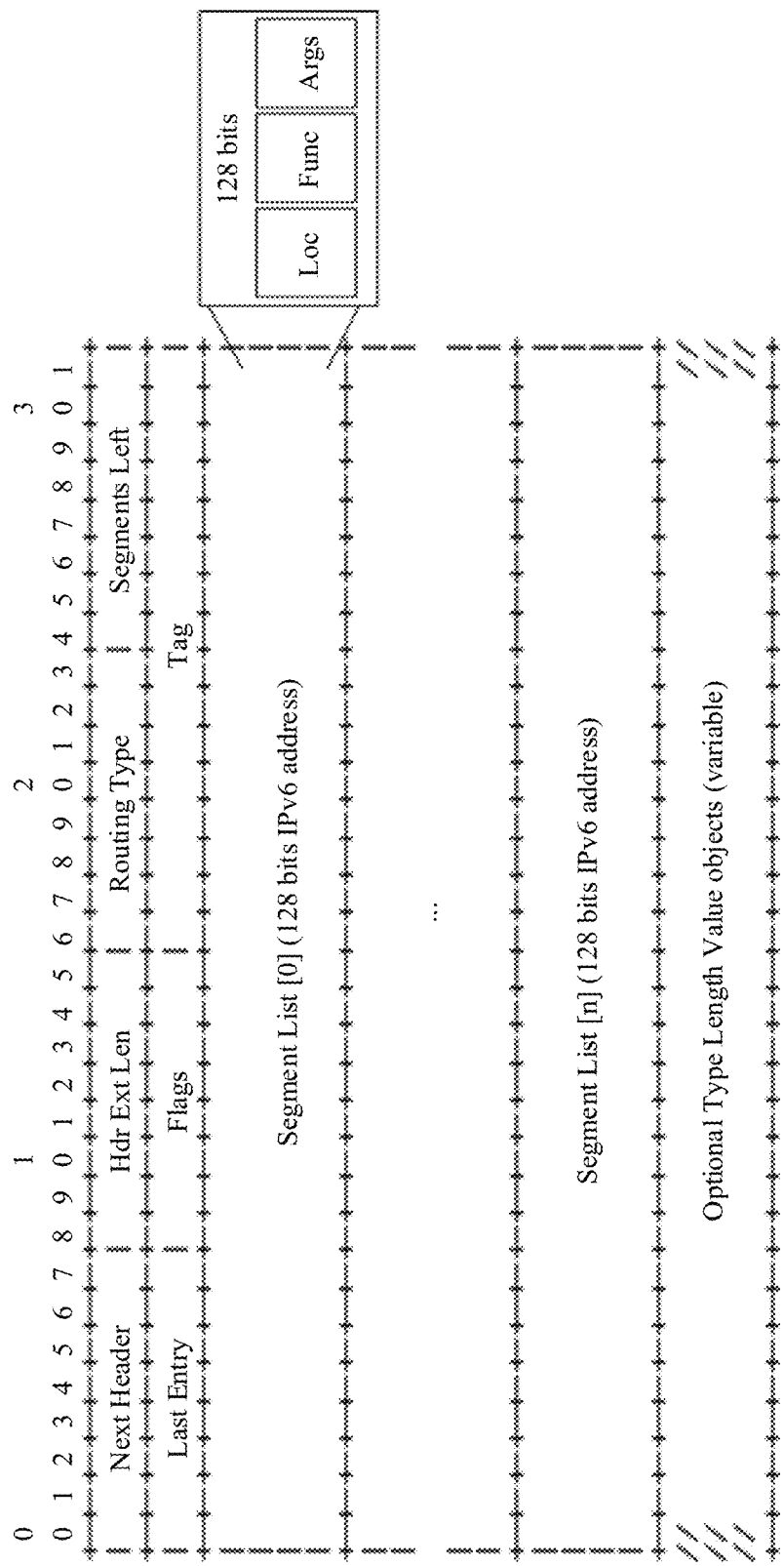
FIG. 6 is a schematic diagram of a format of an SRH according to an embodiment of this application.

In an SRv6 network, when the head node can encapsulate the received packet into a SRv6 packet, in one case, the head node encapsulates the indication identifier into an SRH in the SRv6 packet. For a format of the SRH, refer to FIG. 6. For a specific format of the SRH in the SRv6, refer to IPv6 SRH draft-ietf-6man-segment-routing-header-18 draft.

For example, the indication identifier may be encapsulated into an arguments (Args) field in each SID in the SRH. In this way, after the packet is forwarded to each intermediate node, the intermediate nodes can obtain the indication identifier by reading the SID corresponding to the intermediate nodes from the SRH, without additionally reading other information. This improves packet forwarding efficiency.

For another example, the indication identifier may alternatively be encapsulated into optional type length value (TLV) objects in the SRH or a specified target SID. It should be noted that the target SID may be any original SID in the SRH, or may be a last SID newly added to the SRH. When the indication identifier is encapsulated into the target SID, the controller further needs to deliver a forwarding policy to each intermediate node, to indicate each intermediate node to read the target SID in addition to reading an SID corresponding to the intermediate node, so as to obtain the indication identifier. In this way, redundant encapsulation of the indication identifier at a plurality of locations can be minimized, thereby improving an encapsulation rate of a packet.

For another example, the indication identifier may be encapsulated into a tag field or a flags field in the SRH. Alternatively, parts of the indication identifier may be encapsulated and stored into a tag field and a flags field in the SRH separately. For example, the flow ID and the sequence number are encapsulated into the tag field, and the flag (or color) and the template ID are encapsulated into the flags field.

Figure 7:
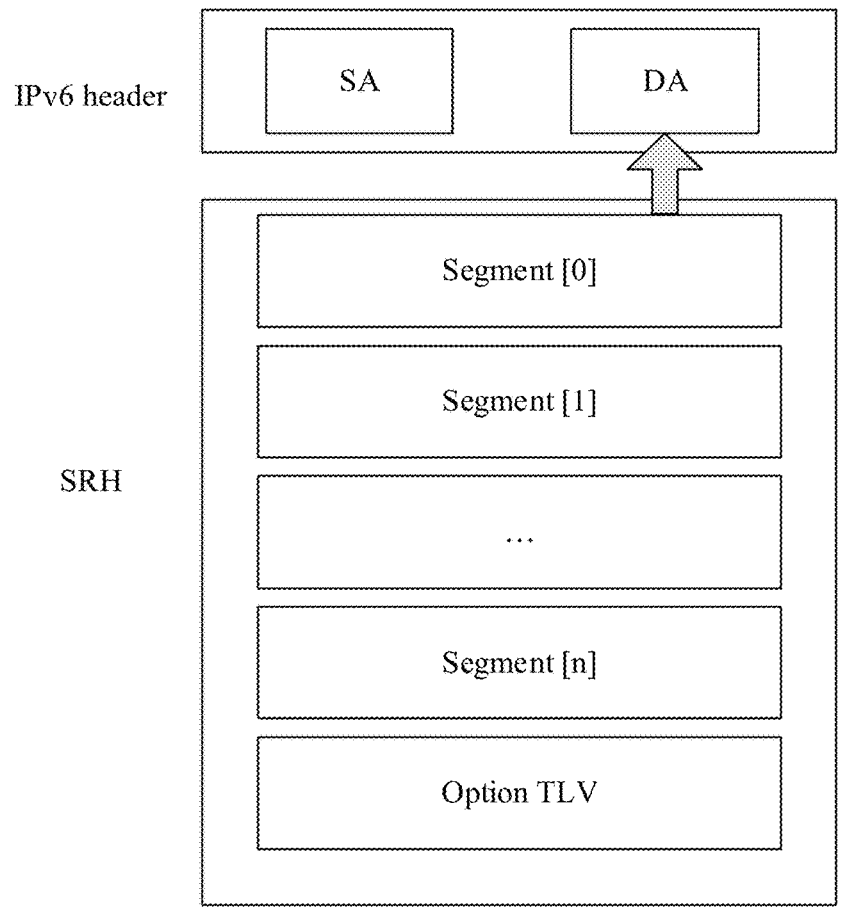
FIG. 7 is a schematic diagram of a format of an SRv6 packet according to an embodiment of this application.

In another case in the SRv6 network, referring to a packet format shown in FIG. 7, the head node may also encapsulate the indication identifier into an unused SA in the IPv6 header. When the packet arrives at each intermediate node, the intermediate node reads the indication identifier encapsulated in the SA. Alternatively, in a best effort scenario in the SRv6, a DA of an outer IPv6 of the SRv6 is a SID of a tail node. Because a sequence of nodes does not change, the DA of the IPv6 remains unchanged. Therefore, the DA in the IPv6 header may also be used to encapsulate the indication identifier. In this way, when a packet arrives at each intermediate node, the intermediate node reads the indication identifier encapsulated in the DA. In addition, in the SRv6 network, the head node may alternatively add the indication identifier to the SRv6 segment list.

Figure 8:
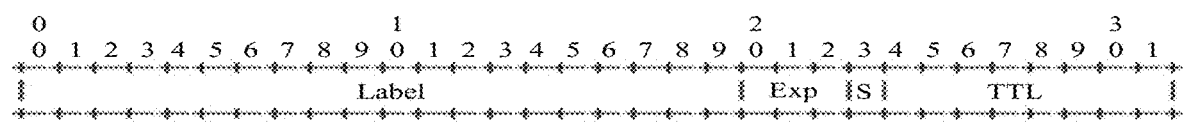
FIG. 8 is a schematic diagram of a format of an MPLS label according to an embodiment of this application.

In an MPLS network, the head node may encapsulate the received packet into an MPLS packet, and the head node may encapsulate the indication identifier into a label stack in the MPLS packet. For example, refer to a format of an MPLS label shown in FIG. 8. The indication identifier may be encapsulated into a last label field in the MPLS label stack, so that when the packet arrives at each intermediate node, the intermediate node reads the indication identifier encapsulated in the last label. The packet forwarded by using the MPLS may be an IP version 4 (IPv4) packet, or may be an IPv6 packet.

It should be noted that the foregoing describes only several encapsulation locations that can be read by each node as an example.

It should be noted that step 201 may be performed by the head node 100 in FIG. 1, and the head node and a first network device in the following embodiments belong to different descriptions of a same device.

It can be learned that the indication identifier is encapsulated into the encapsulation location that can be shared by all nodes in the packet, and the indication identifier uses a format common to a plurality of services, which can overcome current problems such as complex operations and relatively low efficiency when a traffic flow provides different services.

Step 202: The head node sends the packet of the traffic flow to the intermediate node.

It may be understood that the intermediate node in step 202 may be a next-hop intermediate node of the head node, for example, the intermediate node 200 in FIG. 1, and the packet of the traffic flow is a packet encapsulated with the indication identifier.

Step 203: The intermediate node performs, according to the service policy, an operation corresponding to the service on the packet of the traffic flow.

During specific implementation, when the intermediate node receives the packet of the traffic flow into which the indication identifier is encapsulated, the intermediate node may obtain the indication identifier based on the packet of the traffic flow, for example, read, from a specific location in the packet, the indication identifier carried in the packet. Certainly, the indication identifier of the packet may also be calculated in another manner. A service corresponding to the indication identifier is determined according to the service policy and the operation corresponding to the queried service is performed on the packet of the traffic flow.

For example, when the indication identifier includes only the flow ID, and the service policy includes a correspondence between the flow ID and the service, the intermediate node may read the flow ID in the received packet of the traffic flow, and determine a specific service corresponding to the flow ID based on the correspondence between the flow ID and the service. In other words, the intermediate node can perform an operation corresponding to the determined service on the packet of the traffic flow.

In another example, when the indication identifier includes only the template ID, and the service policy includes a correspondence between the template ID and the service, the intermediate node may read the template ID in the received packet of the traffic flow, and determine a specific service corresponding to the template ID based on the correspondence between the template ID and the service. In other words, the intermediate node can perform the operation corresponding to the determined service on the packet of the traffic flow.

In another example, when the indication identifier includes the flow ID and the flag, and the service policy includes a correspondence between the flow ID, the flag, and the service, the intermediate node may read the flow ID and the flag in the received packet of the traffic flow and determine a specific service corresponding to the flow ID and the flag based on the correspondence between the flow ID, the flag, and the service. In other words, the intermediate node can perform the operation corresponding to the determined service on the packet of the traffic flow.

In another example, when the indication identifier includes the flow ID and the template ID, and the service policy includes a correspondence between the flow ID, the template ID, and the service, the intermediate node may read the flow ID and the template ID in the received packet of the traffic flow, and determine a specific service corresponding to the flow ID and the template ID based on the correspondence between the flow ID, the template ID, and the service. In other words, the intermediate node can perform the operation corresponding to the determined service on the packet of the traffic flow.

In another example, when the indication identifier includes the flag and the template ID, and the service policy includes a correspondence between the flag, the template ID, and the service, the intermediate node may read the flag and the template ID in the received packet of the traffic flow, and determine a specific service corresponding to the flag and the template ID based on the correspondence among the flag, the template ID, and the service. In other words, the intermediate node can perform the operation corresponding to the determined service on the packet of the traffic flow.

In another example, when the indication identifier includes the flow ID, the flag, and the template ID, and the service policy includes a correspondence between the flow ID, the flag, the template ID, and the service, the intermediate node may read the flow ID, the flag, and the template ID in the received packet of the traffic flow, and determine a specific service corresponding to the flow ID, the flag and the template ID based on the correspondence between the flow ID, the flag, the template ID, and the service. In other words, the intermediate node can perform the operation corresponding to the determined service on the packet of the traffic flow.

In some service scenarios, the intermediate node may perform operations corresponding to different services on the received packet of the traffic flow, to provide different services.

When the service determined by the intermediate node is a load balancing service implemented by using an equal-cost multi-path routing (ECMP) technology, an operation corresponding to the service performed by the intermediate node may include using the indication identifier as an input of a hash algorithm, and determining a target service path based on an output result of the hash algorithm, to implement load sharing of a plurality of equal-cost paths dedicated to the network.

When the service determined by the intermediate node is the SFC service, the operation corresponding to the service performed by the intermediate node may include the intermediate node determining a carried service function based on the indication identifier in the packet, and sending the packet of the traffic flow to a service function processing module (SF) corresponding to the service function for processing. After SF completes processing, the packet of the traffic flow is returned to the intermediate node for a next provided service function. For example, the service function may include deep packet inspection (DPI), a firewall, and the like.

When the service determined by the intermediate node is the DetNet service, the operation corresponding to the service performed by the intermediate node may include performing multi-fed and selective receiving on a packet by using the sequence number encapsulated in the packet when the head node sends the packet to the intermediate node through a plurality of paths. In other words, for each received packet, the intermediate node determines, based on the sequence number, whether the packet has been received, and when the packet has been received, the intermediate node deletes the duplicate packet.

When the service determined by the intermediate node is a path segment service, the operation corresponding to the service performed by the intermediate node may include determining, based on the indication identifier, a service path segment that the traffic flow passes through.

When the service determined by the intermediate node is the PBT service, the operation corresponding to the service performed by the intermediate node may include identifying the traffic flow based on the indication identifier, and then initiate collecting and reporting of related performance information of the traffic flow, such as, but not limited to, the inbound interface number, the outbound interface number, the inbound timestamp, the outbound timestamp, and the packet loss statistics.

It should be noted that, after receiving the packet of the traffic flow, each intermediate node performs step 203 to process the received packet of the traffic flow. After completing corresponding processing on the packet of the traffic flow, the intermediate node continues to send the packet of the traffic flow to the next-hop intermediate node. Then, the next-hop intermediate node further performs step 203 to process the received packet of the traffic flow. By analogy, all the intermediate nodes perform step 203, and then the following step 204 is performed.

For example, assuming that the path sequentially includes a head node 1, a tunnel intermediate node 2, an intermediate node 3, and a tail node 4, the head node 1 sends a traffic flow packet R encapsulated with the indication identifier to the intermediate node 2. After the intermediate node 2 performs the operation corresponding to the service on the traffic flow packet R according to the service policy, the intermediate node 2 sends the traffic flow packet R to the intermediate node 3. The intermediate node 3 performs the operation corresponding to the service on the traffic flow packet R according to the service policy. After completing processing, the intermediate node 3 identifies that the intermediate node 3 is the last intermediate node on the path, and a next hop is the tail node. It is considered that step 203 of the service provided by the current traffic flow is completed.

It should be noted that step 203 may be performed by the intermediate node 200 and the intermediate node 300 in FIG. 1 in sequence.

It should be noted that when the head node also has the service policy, the head node may also perform step 203, that is, perform the operation corresponding to the service on the packet of the traffic flow according to the service policy. For specific implementation, refer to related descriptions of implementation of the intermediate node.

Step 204: The head node sends the packet of the traffic flow to the tail node.

During specific implementation, after all the intermediate nodes perform step 203, the last intermediate node may send the packet of the traffic flow to the tail node. After receiving the packet of the traffic flow, the tail node may decapsulate the packet of the traffic flow, for example, decapsulate the indication identifier encapsulated in the packet of the traffic flow in step 201, to obtain the packet of the traffic flow initially received by the head node. In this way, it may be considered that a process of providing the service for the traffic flow is completed.

For example, after the last intermediate node 3 on the path performs a service operation on the traffic flow packet R according to the service policy, the intermediate node 3 may send the traffic flow packet R to the tail node 4, and the tail node 4 decapsulates the traffic flow packet R, that is, decapsulates the encapsulated indication identifier from the traffic flow packet R, to obtain the packet of the traffic flow initially received by the head node 1, so as to complete the service provided for the traffic flow at the current time.

It should be noted that step 204 may be performed by the tail node 400 in FIG. 1.

It should be noted that when the tail node also has the service policy, the tail node may also perform step 203, that is, perform the operation corresponding to the service on the packet of the traffic flow according to the service policy, and then perform a subsequent operation such as decapsulation on the packet of the traffic flow.

In this way, in the method for providing a service for a traffic flow provided in this embodiment of this application, the indication identifier that can be identified by all services is introduced to indicate a service that needs to be provided for the traffic flow. In addition, the indication identifier is encapsulated at the location that can be shared by all the nodes (that is, a field that can be directly read after the packet of the traffic flow is received). This is to ensure that each node can perform an operation of a corresponding service on the packet of the traffic flow to provide a corresponding service after receiving the packet of the traffic flow, without performing additional operations such as reading, query, and parsing, and flow identifier conversion during cross-domain transmission. In this way, a node that the traffic flow passes through can simply and efficiently provide various services.

Figure 9:
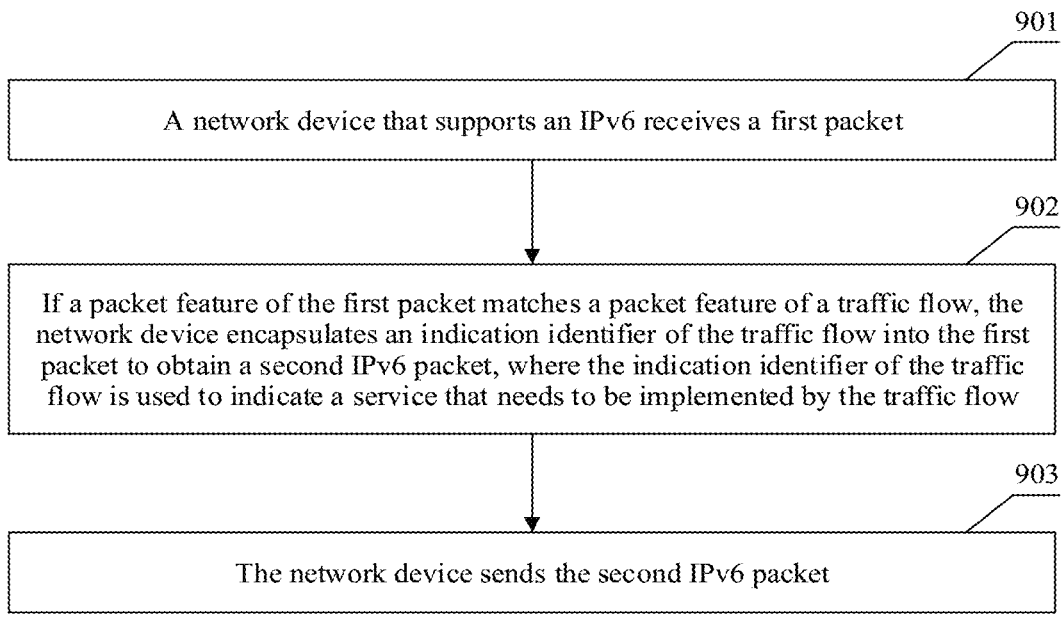
FIG. 9 is a schematic flowchart of a method for providing a service for a traffic flow according to an embodiment of this application.

In addition, an embodiment of this application further provides a method for providing a service for a traffic flow. In the method, an indication identifier is encapsulated into an IPv6 header/extension header, and a head node is used as a network device that performs the method. Referring to FIG. 9, the method may include the following steps.

Step 901: The network device receives a first packet, and the network device supports an IPv6.

Step 902: When a packet feature of the first packet matches a packet feature of the traffic flow, the network device encapsulates an indication identifier of the traffic flow into the first packet to obtain a second IPv6 packet, where the indication identifier of the traffic flow is used to indicate the service provided for the traffic flow.

Step 903: The network device sends the second IPv6 packet.

The indication identifier includes an identifier of the service.

It may be understood that the service includes any one or more of the following services: OAM, SFC, and DetNet.

As an example, the indication identifier further includes an identifier of an operation corresponding to the service and/or a sequence number carried in the first packet.

It may be understood that the second IPv6 packet includes an IPv6 extension header, and the IPv6 extension header includes the indication identifier.

In an IPv6 network, the IPv6 extension header includes a hop-by-hop options header field or a destination options header field in the second IPv6 packet. The hop-by-hop options header field or the destination options header field includes the indication identifier.

In an SRv6 network, the second IPv6 packet is a SRv6 packet, the network device supports the SRv6, the IPv6 extension header includes an SRH of the second IPv6 packet, and the SRH includes the indication identifier. In one case, the SRH includes an SID, and the SID includes the indication identifier. In another case, the SID includes an arguments field, and the arguments field includes the indi- cation identifier. In still another case, the SRH includes a tag field and/or a flags field, and the tag field or the flags field or both include the indication identifier. The SRv6 packet includes an SRv6 segment list (English Segment list). The SRv6 segment list includes the indication identifier. More further, a last label in an MPLS label stack includes the indication identifier.

In addition, when the second IPv6 packet is the SRv6 packet, the network device supports the SRv6, the second IPv6 packet includes the IPv6 header, the IPv6 header of the second IPv6 packet includes an SA field, and the SA field includes the indication identifier. In an embodiment, the second IPv6 packet is the SRv6 packet, the network device supports SRv6 best effort, the IPv6 extension header in the second IPv6 packet includes a DA field in the IPv6 header, and the DA field includes the indication identifier.

In addition, the second IPv6 packet includes the IPv6 header, the IPv6 header includes a flow label field, and the flow label field includes the indication identifier.

In another example, the indication identifier further includes a flow label or a flow identifier.

It should be noted that for a specific implementation and an effect of the embodiment shown in FIG. 9, refer to related descriptions of step 201 and step 202 in FIG. 2.

Figure 10:
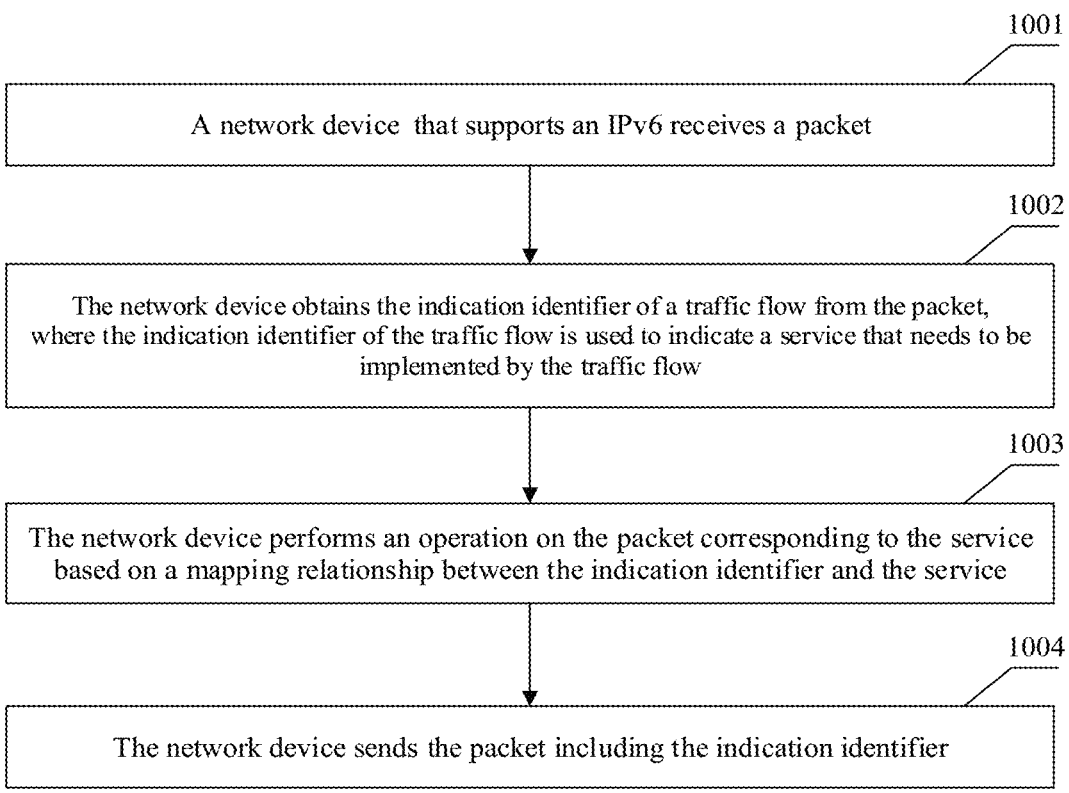
FIG. 10 is a schematic flowchart of another method for providing a service for a traffic flow according to an embodiment of this application.

In addition, an embodiment of this application further provides a method for providing a service for a traffic flow. In the method, an indication identifier is encapsulated into an IPv6 header/extension header, and an intermediate node is used as a network device that performs the method. Referring to FIG. 10, the method may include the following steps.

Step 1001: The network device receives a packet, and the network device supports an IPv6.

Step 1002: The network device obtains an indication identifier of a traffic flow from the packet, where the indication identifier of the traffic flow is used to indicate the service provided for the traffic flow.

Step 1003: The network device performs an operation corresponding to the service on the packet based on a mapping relationship between the indication identifier and the service.

Step 1004: The network device sends the packet including the indication identifier.

The indication identifier includes an identifier of the service.

It may be understood that the service includes any one or more of the following services: OAM, SFC, and DetNet.

As an example, the indication identifier further includes an identifier of the operation corresponding to the service and/or a sequence number of the received packet.

It may be understood that the packet including the indi- cation identifier is an IPv6 packet, the IPv6 packet includes an IPv6 extension header, and the IPv6 extension header includes the indication identifier. The IPv6 extension header includes a hop-by-hop options header field or a destination options header field of the IPv6 packet. The hop-by-hop options header field or the destination options header field includes the indication identifier.

In an SRv6 network, the packet including the indication identifier is a SRv6 packet, the network device supports the SRv6, the IPv6 extension header includes an SRH of the packet, and the SRH includes the indication identifier. In one case, the SRH includes an SID, and the SID includes the indication identifier. In another case, the SID includes an arguments field, and the arguments field includes the indi- cation identifier. In still another case, the SRH includes a tag field and/or a flags field, and the tag field or the flags field or both include the indication identifier.

In addition, the packet including the indication identifier is the SRv6 packet, the network device supports the SRv6, the SRv6 packet includes the IPv6 header, the IPv6 header includes an SA field, and the SA field includes the indication identifier. In some embodiments, the network device supports SRv6 BE, the SRv6 packet includes the IPv6 header, the IPv6 header in the SRv6 packet includes a DA field, and the DA field includes the indication identifier.

In addition, the packet including the indication identifier includes the IPv6 header, the IPv6 header includes a flow label field, and the flow label field includes the indication identifier.

In yet another example, the indication identifier further includes a flow label or a flow identifier.

It should be noted that for a specific implementation and an effect of the embodiment shown in FIG. 10, refer to related descriptions of step 203 and step 204 in FIG. 2.

Figure 11:
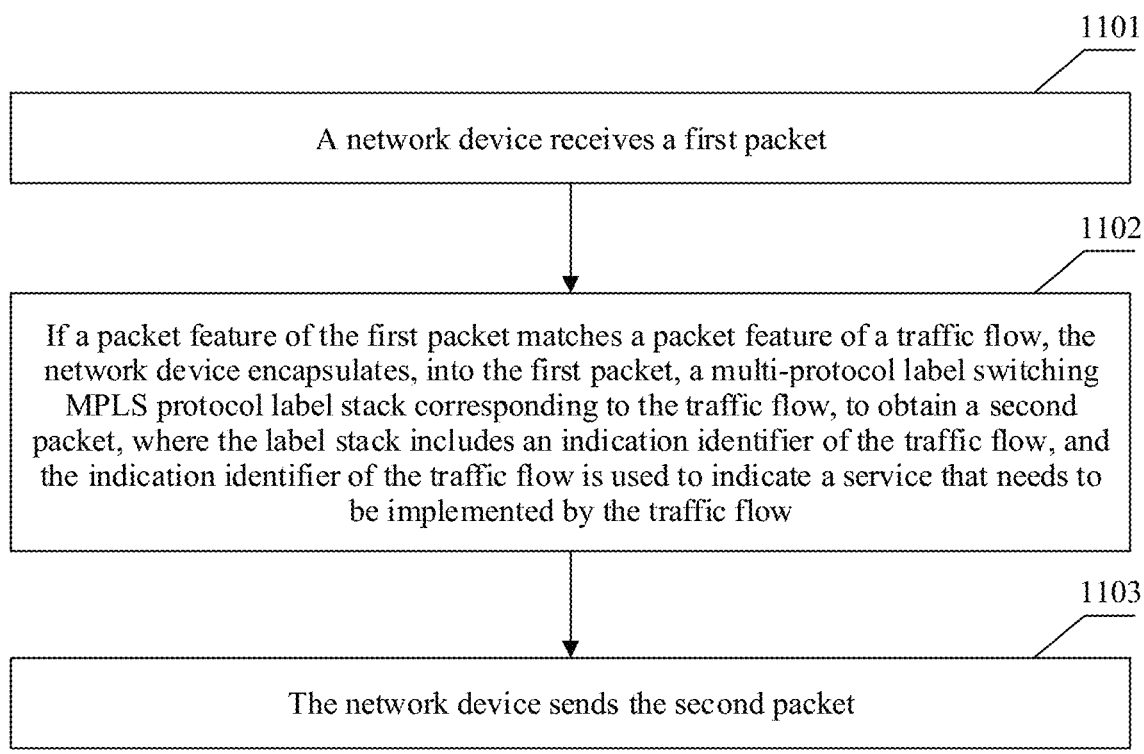
FIG. 11 is a schematic flowchart of still another method for providing a service for a traffic flow according to an embodiment of this application.

In addition, an embodiment of this application further provides a method for providing a service for a traffic flow. In the method, an indication identifier is encapsulated into an MPLS label stack, and a head node is used as a network device that performs the method. Referring to FIG. 11, the method may include the following steps.

Step 1101: The network device receives a first packet.

Step 1102: When a packet feature of the first packet matches a packet feature of the traffic flow, the network device encapsulates, into the first packet, an MPLS protocol label stack corresponding to the traffic flow, to obtain a second packet, where the label stack includes the indication identifier of the traffic flow, and an indication identifier of the traffic flow is used to indicate the service provided for the traffic flow.

Step 1103: The network device sends the second packet.

The indication identifier includes an identifier of the service.

It may be understood that the service includes any one or more of the following services: OAM, SFC, or DetNet.

As an example, the indication identifier further includes an identifier of an operation corresponding to the service and/or a sequence number carried in the first packet.

It may be understood that a last label in the label stack includes the indication identifier.

It should be noted that for a specific implementation and an effect of the embodiment shown in FIG. 11, refer to related descriptions of step 201 and step 202 in FIG. 2.

Figure 12:
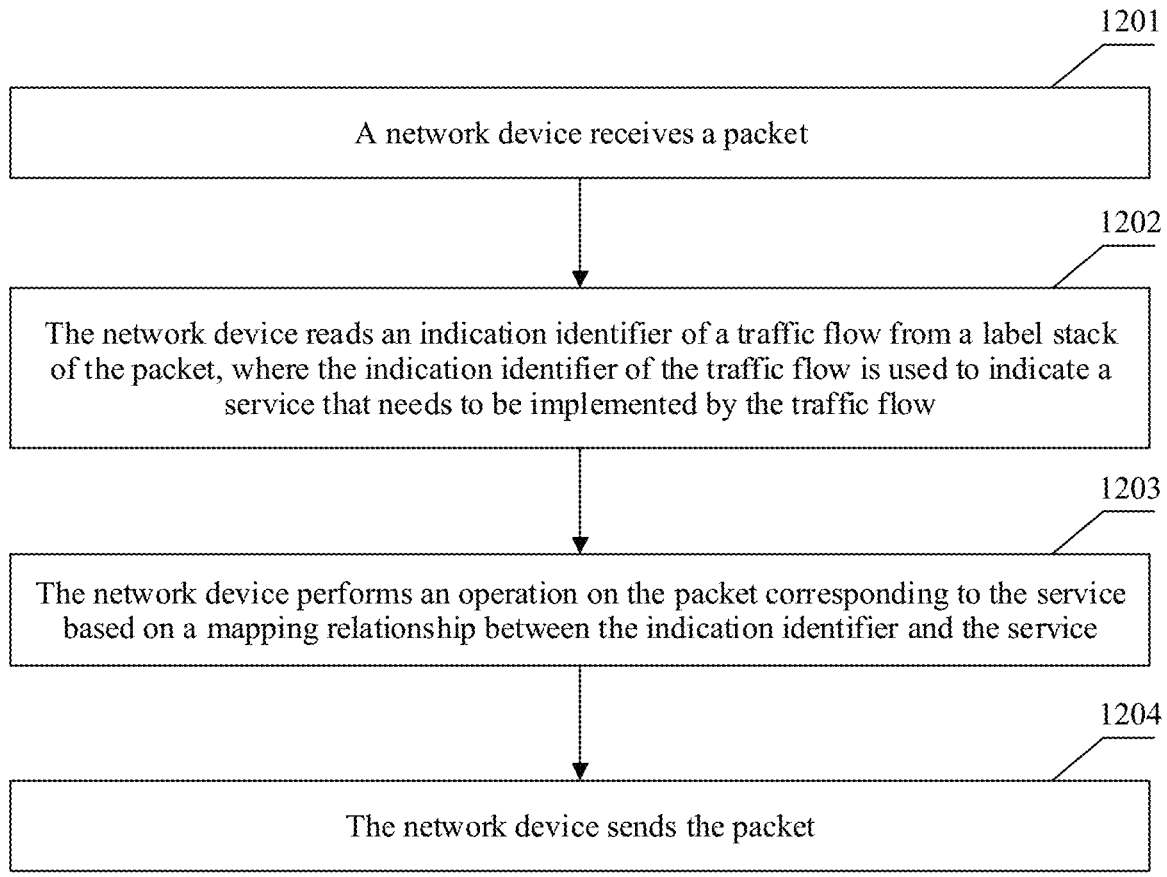
FIG. 12 is a schematic flowchart of yet another method for providing a service for a traffic flow according to an embodiment of this application.

In addition, an embodiment of this application further provides a method for providing a service for a traffic flow. In the method, an indication identifier is encapsulated into an MPLS label stack, and an intermediate node is used as a network device that performs the method. Referring to FIG. 12, the method may include the following steps.

Step 1201: The network device receives a packet.

Step 1202: The network device reads the indication identifier of the traffic flow from a label stack of the packet, where the indication identifier of the traffic flow is used to indicate the service provided for the traffic flow.

Step 1203: The network device performs an operation corresponding to the service based on a mapping relationship between the indication identifier and the service.

Step 1204: The network device sends the packet.

The indication identifier includes an identifier of the service.

The label stack may be the MPLS label stack, or may be an SRv6 segment list. The label stack includes the indication identifier. Further, the MPLS label stack or the SRv6 segment list includes the indication identifier. Furthermore, a last label in the MPLS label stack includes the indication identifier.

It may be understood that the service includes any one or more of the following services: OAM, SFC, or DetNet.

As an example, the indication identifier further includes the identifier of an operation corresponding to the service and/or a sequence number Sequence Number carried in the packet.

It may be understood that a last label in the label stack includes the indication identifier.

It should be noted that for a specific implementation and an effect of the embodiment shown in FIG. 12, refer to related descriptions of step 203 and step 204 in FIG. 2.

Figure 13:
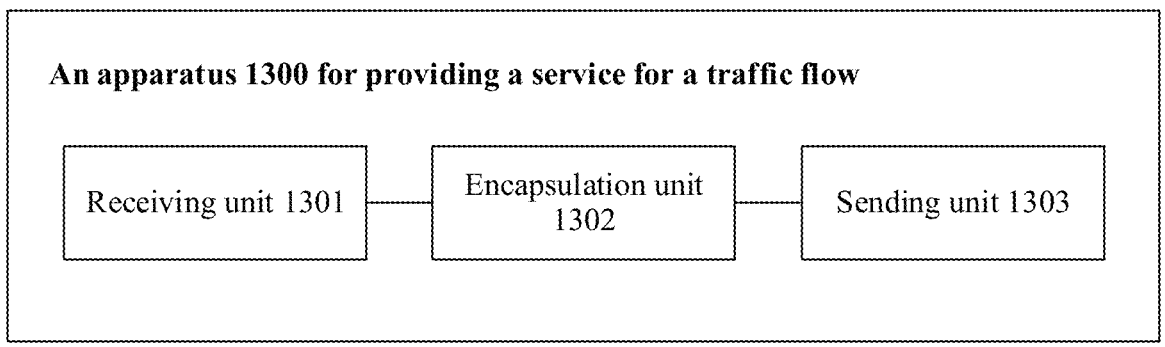
FIG. 13 is a schematic diagram of a structure of an apparatus for providing a service for a traffic flow according to an embodiment of this application.

FIG. 13 is a schematic diagram of a structure of an apparatus 1300 for providing a service for a traffic flow according to an embodiment of this application. The apparatus 1300 includes a receiving unit 1301, an encapsulation unit 1302, and a sending unit 1303. The receiving unit 1301 is configured to receive a first packet. The encapsulation unit 1302 is configured to encapsulate an indication identifier of the traffic flow into a first packet to obtain a second packet when a packet feature of the first packet matches a packet feature of the traffic flow, where the indication identifier of the traffic flow is used to indicate the service provided for the traffic flow. The sending unit 1303 is configured to send the second packet.

In some embodiments, the second packet is an IPv6 packet or an MPLS packet.

The indication identifier includes an identifier of the service. The service includes any one or more of the following services: OAM, SFC, or DetNet.

As an example, the indication identifier further includes an identifier of an operation corresponding to the service and/or a sequence number carried in the first IPv6 packet.

In some embodiments, when the second packet is the IPv6 packet, the second packet includes an IPv6 extension header, and the IPv6 extension header includes the indication identifier. In this way, the indication identifier may be encapsulated into the IPv6 extension header that is in the packet and that is to be read by each intermediate node, to improve packet processing efficiency of the intermediate node.

In other embodiments, in the IPv6 network, the IPv6 extension header in the second packet includes a hop-by-hop options header field or a destination options header field in the second packet. The hop-by-hop options header field or the destination options header field includes the indication identifier.

In still other embodiments, in an SRv6 network, the second packet is an SRv6 packet, the apparatus 1300 support the SRv6, where the SRv6 packet includes the IPv6 extension header, the IPv6 extension header includes an SRH of the second packet, and the SRH includes the indication identifier. In one case, the SRH includes an SID, and the SID includes the indication identifier. In another case, the SID includes an arguments field, and the arguments field includes the indication identifier. In still another case, the SRH includes a tag field and/or a flags field, and the tag field or the flags field or both include the indication identifier.

In other embodiments, still in the SRv6 network, the second packet is the SRv6 packet, the apparatus 1300 supports the SRv6, the second packet includes an IPv6 header, the IPv6 header in the second packet includes an SA field, and the SA field includes the indication identifier. In some embodiments, the second packet is the SRv6 packet, the apparatus 1300 supports SRv6 best effort BE, the IPv6 extension header in the second IPv6 packet includes a DA field in the IPv6 header, and the DA field includes the indication identifier.

In addition, the second packet includes the IPv6 header, the IPv6 header includes a flow label field, and the flow label field includes the indication identifier.

It should be noted that the indication identifier further includes a flow label or a flow identifier.

It may be understood that, for various specific embodiments of the apparatus 1300 shown in FIG. 13, refer to the description of the embodiment shown in FIG. 9. Details are not described in this embodiment again.

Figure 14:
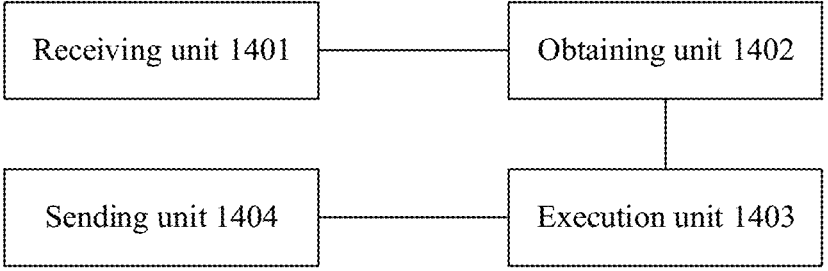
FIG. 14 is a schematic diagram of a structure of another apparatus for providing a service for a traffic flow according to an embodiment of this application.

FIG. 14 is a schematic diagram of a structure of an apparatus 1400 for providing a service for a traffic flow according to an embodiment of this application. The apparatus 1400 may include a receiving unit 1401, an obtaining unit 1402, an execution unit 1403, and a sending unit 1404. The receiving unit 1401 is configured to receive a packet. The obtaining unit 1402 is configured to obtain an indication identifier of a traffic flow based on the received packet, where the indication identifier of the traffic flow is used to indicate the service provided for the traffic flow. The execution unit 1403 is configured to perform an operation corresponding to the service on the packet, based on a mapping relationship between the indication identifier and the service. The sending unit 1404 is configured to send the packet including the indication identifier.

The indication identifier includes an identifier of the service. The service includes any one or more of the following services: OAM SFC, or DetNet.

In an example, the indication identifier further includes an identifier of the operation corresponding to the service and/or a sequence number of the received packet.

In some implementations, the packet including the indication identifier is an IPv6 packet, the packet including the indication identifier includes an IPv6 extension header, and the IPv6 extension header includes the indication identifier. In this way, the indication identifier may be encapsulated into the IPv6 extension header that is in the packet and that is to be read by each intermediate node, to improve packet processing efficiency of the intermediate node. In other implementations, the IPv6 extension header includes a hop-by-hop options header field or a destination options header field of the IPv6 packet, where the hop-by-hop options header field or the destination options header field includes the indication identifier.

In still other implementations, in the SRv6 network, the packet including the indication identifier is an SRv6 packet, the apparatus 1400 supports SRv6, the IPv6 extension header includes an SRH of the packet, and the SRH includes the indication identifier. In one case, the SRH includes an SID, and the SID includes the indication identifier. In another case, the SID includes an arguments field, and the arguments field includes the indication identifier. In still another case, the SRH includes a tag field and/or a flags field, and the tag field or the flags field or both include the indication identifier.

In yet other implementations, still in the SRv6 network, the packet including the indication identifier is the SRv6 packet, the apparatus 1400 supports the SRv6, the SRv6 packet includes an IPv6 header, the IPv6 header includes an SA field, and the SA field includes the indication identifier. In some embodiments, the packet including the indication identifier is the SRv6 packet, the apparatus 1400 supports SRv6 BE, the SRv6 packet includes the IPv6 header, the IPv6 header in the SRv6 packet includes a DA field in the IPv6 header, and the DA field includes the indication identifier.

In some embodiments, the packet including the indication identifier includes the IPv6 header, the IPv6 header includes a flow label field, where the flow label field includes the indication identifier.

It should be noted that the indication identifier further includes a flow label or a flow identifier.

It may be understood that, for various specific embodiments of the apparatus 1400 shown in FIG. 14, refer to the description of the embodiment shown in FIG. 10. Details are not described in this embodiment again.

Figure 15:
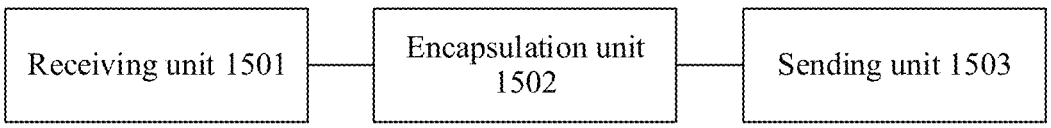
FIG. 15 is a schematic diagram of a structure of still another apparatus for providing a service for a traffic flow according to an embodiment of this application.

FIG. 15 is a schematic diagram of a structure of an apparatus 1500 for providing a service for a traffic flow according to an embodiment of this application. The apparatus 1500 includes a receiving unit 1501, an encapsulation unit 1502, and a sending unit 1503. The receiving unit 1501 is configured to receive a first packet. The encapsulation unit 1502 is configured to, encapsulate an MPLS protocol label stack corresponding to a traffic flow into a first packet to obtain a second packet when a packet feature of the first packet matches a packet feature of the traffic flow, where the label stack includes the indication identifier of the traffic flow, and the indication identifier of the traffic flow is used to indicate the service provided for the traffic flow. The sending unit 1503 is configured to send the second packet.

The indication identifier includes an identifier of the service. The service includes any one or more of the following services OAM, SFC, or DetNet.

In an example, the indication identifier further includes an identifier of an operation corresponding to the service and/or a sequence number carried in the first packet.

In some implementations, a last label in the label stack includes the indication identifier.

It may be understood that, for various specific embodiments of the apparatus 1500 shown in FIG. 15, refer to the description of the embodiment shown in FIG. 11. Details are not described in this embodiment again.

Figure 16:
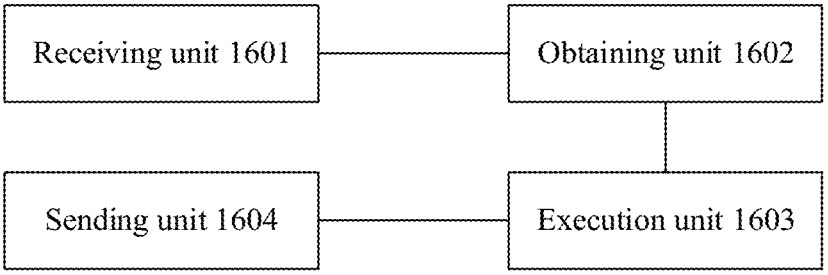
FIG. 16 is a schematic diagram of a structure of yet another apparatus for providing a service for a traffic flow according to an embodiment of this application.

FIG. 16 is a schematic diagram of a structure of an apparatus 1600 for providing a service for a traffic flow according to an embodiment of this application. The apparatus 1600 may include a receiving unit 1601, an obtaining unit 1602, an execution unit 1603, and a sending unit 1604. The receiving unit 1601 is configured to receive a packet. The obtaining unit 1602 is configured to read an indication identifier of the traffic flow from a label stack of the packet, where the indication identifier of the traffic flow is used to indicate the service provided for the traffic flow. The execution unit 1603 is configured to perform an operation corresponding to the service on the packet, based on a mapping relationship between the indication identifier and the service. The sending unit 1604 is configured to send the packet. The label stack may be an MPLS label stack, or may be an SRv6 segment list. The label stack includes the indication identifier. Further, the MPLS label stack or the SRv6 segment list includes the indication identifier. Furthermore, a last label in the MPLS label stack includes the indication identifier.

The indication identifier includes an identifier of the service. The service includes any one or more of the following services: OAM, SFC, or DetNet.

In an example, the indication identifier further includes an identifier of the operation corresponding to the service and/or a sequence number of the packet.

In some implementations, a last label in the label stack includes the indication identifier.

It may be understood that, for various specific embodiments of the apparatus 1600 shown in FIG. 16, refer to the description of the embodiment shown in FIG. 12. Details are not described in this embodiment again.

Any one of the foregoing apparatus 1300, apparatus 1400, apparatus 1500, and apparatus 1600 may be located on a network device that supports IPv6.

In addition, an embodiment of this application further provides a computer program product. When the computer program product runs on a computer, the computer performs the method for providing a service for a traffic flow in any implementation of the methods shown in FIG. 9 to FIG. 12.

In addition, an embodiment of this application further provides a computer-readable storage medium. The computer-readable storage medium stores instructions. When the instructions are run on a computer or a processor, the computer or the processor is enabled to perform the method for providing a service for a traffic flow in any possible implementation of the methods shown in FIG. 9 to FIG. 12.

"First" in terms such as the "first IPv6 packet" and the "first packet" mentioned in the embodiments of this application is merely used as a name identifier, but does not represent the first position in sequence. This rule is also applicable to "second" and the like.

From the foregoing descriptions of the implementations, a person skilled in the art may clearly understand that some or all steps of the methods in the embodiments may be implemented by software in addition to a universal hardware platform. Based on such an understanding, the technical solutions of this application may be implemented in a form of a software product. The software product may be stored in a storage medium, such as a read-only memory (ROM)/random-access memory (RAM), a magnetic disk, or an optical disc, and includes several instructions for instructing a computer device (which may be a personal computer, a server, or a network communications device such as a router) to perform the methods described in the embodiments or some parts of the embodiments of this application.

The embodiments in this specification are all described in a progressive manner, for same or similar parts in the embodiments, reference may be made to these embodiments, and each embodiment focuses on a difference from other embodiments. Especially, apparatus and device embodiments are basically similar to a method embodiment, and therefore is described briefly. For related parts, refer to partial descriptions in the method embodiment. The described method, apparatus and device embodiments are merely examples. The modules described as separate parts may or may not be physically separate, and parts displayed as modules may or may not be physical modules, may be located in one position, or may be distributed on a plurality of network units. Some or all the modules may be selected according to actual needs to achieve the objectives of the solutions of the embodiments. A person of ordinary skill in the art may understand and implement the embodiments of the present disclosure without creative efforts.

The foregoing descriptions are merely example implementations of this application, but are not intended to limit the protection scope of this application.

What is claimed is:

1. A network device comprising:
a processor; and
a memory coupled to the processor and configured to store instructions for execution by the processor, wherein the instructions, when executed by the processor, cause the network device to:
receive a first packet;
encapsulate an indication identifier of a traffic flow into the first packet to obtain a second packet when a packet feature of the first packet matches a packet feature of the traffic flow, wherein the indication identifier of the traffic flow is used to indicate at least two services provided for the traffic flow, wherein the at least two services comprise any two or more of operations, administration and maintenance (OAM), service function chaining (SFC), or deterministic networking (DetNet); and
send a second packet.

2. A network device comprising:
a processor; and
a memory coupled to the processor and configured to store instructions for execution by the processor, wherein the instructions, when executed by the processor, cause the network device to:
receive a second packet;
obtain an indication identifier of a traffic flow based on the second packet, wherein the indication identifier indicates at least two services provided for the traffic flow, wherein the at least two services comprise any two or more of operations, administration and maintenance (OAM), service function chaining (SFC), or deterministic networking (DetNet);
perform at least one operation corresponding to the at least two services on the second packet based on a mapping relationship between the indication identifier and the at least two; and
send the second packet.

3. The network device of claim 2, wherein the second packet is an Internet Protocol (IP) version 6 (IPv6) packet or a Multi-Protocol Label Switching (MPLS) packet.

4. The network device of claim 2, wherein the indication identifier comprises an identifier of the at least two services.

5. The network device of claim 2, wherein the indication identifier further comprises sequence number carried in the second.

6. The network device of claim 5, wherein the indication identifier further comprises an identifier of the at least one operation corresponding to the at least two services.

7. The network device of claim 2, wherein the second packet is an IPv6 packet, wherein the second packet comprises an IPv6 extension header, and wherein the IPv6 extension header comprises the indication identifier.

8. The network device of claim 7, wherein the IPv6 extension header comprises a hop-by-hop options header field or a destination options header field in the second packet, and wherein the hop-by-hop options header field, the destination options header field, or both the hop-by-hop options header field and the destination options header field comprise the indication identifier.

9. The network device of claim 7, wherein the second packet is a segment routing over IPv6 (SRv6) packet, wherein the network device supports SRv6, wherein the IPv6 extension header comprises a segment routing header (SRH) in the second packet, and wherein the SRH comprises the indication identifier.

10. The network device of claim 9, wherein the SRH comprises a segment identifier (SID), and wherein the SID comprises the indication identifier.

11. The network device of claim 10, wherein the SID comprises an arguments field, and wherein the arguments field comprises the indication identifier.

12. The network device of claim 9, wherein the SRH comprises a tag field or a flags field, and wherein the tag field, the flags field, or both the tag field and the flags field comprise the indication identifier.

13. The network device of claim 2, wherein:
when the second packet is an Internet Protocol (IP) version 6 (IPv6) packet, the second packet is a segment routing over IPv6 (SRv6) packet, wherein the network device supports SRv6, wherein the second packet comprises an IPv6 header comprising a source address (SA) field, and wherein the SA field comprises the indication identifier; or
when the second packet is the IPv6 packet, the second packet is an SRv6 packet, wherein the network device supports SRv6 best effort (BE), wherein an IPv6 extension header in the second packet comprises a destination address (DA) field in the IPv6 header, and wherein the DA field comprises the indication identifier.

14. The network device of claim 2, wherein when the second packet is an Internet Protocol (IP) version 6 (IPv6) packet, the second packet comprises an IPv6 header, wherein the IPv6 header comprises a flow label field, and wherein the flow label field comprises the indication identifier.

15. The network device of claim 2, wherein the indication identifier further comprises a flow label or a flow identifier.

16. The network device of claim 3, wherein the second packet is a segment routing over Internet Protocol (IP) version 6 (IPv6) (SRv6) packet, wherein the network device supports SRv6, wherein the second packet comprises an SRv6 segment list, and wherein the SRv6 segment list comprises the indication identifier.

17. The network device of claim 2, wherein when the second packet is a Multi-Protocol Label Switching (MPLS) packet, the second packet comprises an MPLS label stack, and wherein the MPLS label stack comprises the indication identifier of the traffic flow.

18. The network device of claim 17, wherein the indication identifier is located at a last label in the MPLS label stack.

19. A network system comprising:
a network device comprising:
a processor; and
a memory coupled to the processor and configured to store instructions for execution by the processor, wherein the instructions, when executed by the processor, cause the network device to:
receive a second packet;
obtain an indication identifier of a traffic flow based on the second packet, wherein the indication identifier of the traffic flow indicates at least two services provided for the traffic flow, wherein the at least two services comprise any two or more of operations, administration and maintenance (OAM), service function chaining (SFC), or deterministic networking (DetNet);
perform at least one operation corresponding to the at least two services on the second packet based on a mapping relationship between the indication identifier and the at least two services; and
send the second packet.

20. The network device of claim 1, wherein the second packet is an IPv6 packet, comprising an IPv6 extension header comprises a segment routing header (SRH) comprising the indication identifier.

* * * * *

UNITED STATES PATENT AND TRADEMARK OFFICE
CERTIFICATE OF CORRECTION

PATENT NO. : 11,979,322 B2
APPLICATION NO. : 17/527555
DATED : May 7, 2024
INVENTOR(S) : Shuping Peng and Zhenbin Li It is certified that error appears in the above-identified patent and that said Letters Patent is hereby corrected as shown below:

In the Claims

Claim 2, Column 22, Line 30: "fier and the at least two; and" should read "fier and the at least two services; and"

Claim 5, Column 22, Line 39: "second." should read "second packet."

Signed and Sealed this
Twenty-fifth Day of June, 2024

Katherine Kelly Vidal
*Director of the United States Patent and Trademark Office*